(12) United States Patent
Castinado et al.

(10) Patent No.: US 10,284,496 B2
(45) Date of Patent: May 7, 2019

(54) COMPUTERIZED SYSTEM FOR PROVIDING RESOURCE DISTRIBUTION CHANNELS BASED ON PREDICTING FUTURE RESOURCE DISTRIBUTIONS

(71) Applicant: Bank of America Corporation, Charlotte, NC (US)

(72) Inventors: Joseph Benjamin Castinado, New Glenn, CO (US); William August Stahlhut, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 266 days.

(21) Appl. No.: 15/449,334

(22) Filed: Mar. 3, 2017

(65) Prior Publication Data

US 2018/0255000 A1 Sep. 6, 2018

(51) Int. Cl.
*H04L 12/911* (2013.01)

(52) U.S. Cl.
CPC .................. *H04L 47/823* (2013.01)

(58) Field of Classification Search
CPC . H04L 65/4076; H04L 5/0094; H04L 5/0057; G06F 15/16; G06F 16/954; G06F 16/438
USPC .................. 709/203, 226; 370/335
See application file for complete search history.

(56) References Cited

U.S. PATENT DOCUMENTS

| | | | |
|---|---|---|---|
| 7,135,701 B2 | 11/2006 | Amin et al. | |
| 7,260,601 B1 * | 8/2007 | Day .................. | H04H 20/42 370/236 |
| 7,418,283 B2 | 8/2008 | Amin | |
| 7,533,068 B2 | 5/2009 | Maassen van den Brink et al. | |
| 7,619,437 B2 | 11/2009 | Thom et al. | |
| 7,639,035 B2 | 12/2009 | Berkley | |
| 7,898,282 B2 | 3/2011 | Harris et al. | |

(Continued)

FOREIGN PATENT DOCUMENTS

| | | |
|---|---|---|
| AU | 2010249233 A1 | 6/2011 |
| CA | 2886849 A1 | 10/2016 |

(Continued)

*Primary Examiner* — Tesfay Yohannes
(74) *Attorney, Agent, or Firm* — Michael A. Springs; Moore & Van Allen PLLC; Peter B. Stewart

(57) ABSTRACT

A system for providing resource distribution channels based on predicting future resource distributions typically includes a classical computer apparatus and a quantum optimizer in communication with the classical computer apparatus. The classical computer apparatus identifies resource transfer information related to a resource transfer of a user, wherein the user receives a resource collection as a result of the resource transfer. The quantum optimizer analyzes the resource transfer information to predict a future resource distribution of the resource collection. The classical computer apparatus then compares attributes of the future resource distribution to attributes of multiple resource distribution channels, identifies a resource distribution channel having attributes corresponding to the attributes of the future resource distribution, and transmits a command configured to cause a client application stored on a device of the user to display an interface having a selectable option for transferring the resource collection using the resource distribution channel.

15 Claims, 8 Drawing Sheets

(56) References Cited

U.S. PATENT DOCUMENTS

| | | |
|---|---|---|
| 8,008,942 B2 | 8/2011 | van den Brink et al. |
| 8,190,548 B2 | 5/2012 | Choi |
| 8,195,596 B2 | 6/2012 | Rose et al. |
| 8,283,943 B2 | 10/2012 | van den Brink et al. |
| 8,421,053 B2 | 4/2013 | Bunyk et al. |
| 8,744,075 B2 | 6/2014 | Tanaka |
| 8,897,449 B1 | 11/2014 | Broadbent |
| 9,207,672 B2 | 12/2015 | Williams et al. |
| 9,246,675 B2 | 1/2016 | Ding |
| 9,400,499 B2 | 7/2016 | Williams et al. |
| 9,537,660 B2 | 1/2017 | Wang et al. |
| 2004/0139000 A1 | 7/2004 | Amos |
| 2005/0010508 A1 | 1/2005 | Groz |
| 2006/0088157 A1 | 4/2006 | Fujii |
| 2006/0251247 A1 | 11/2006 | Akiyama et al. |
| 2007/0142934 A1* | 6/2007 | Boercsoek ......... G05B 19/4185 700/23 |
| 2007/0142939 A1* | 6/2007 | Duffy .................. G06F 1/12 700/78 |
| 2011/0002309 A1* | 1/2011 | Park ................. H04L 1/1607 370/335 |
| 2012/0002008 A1 | 1/2012 | Valin et al. |
| 2013/0117200 A1 | 5/2013 | Thom |
| 2013/0144969 A1* | 6/2013 | Holden ............ H04N 21/47202 709/217 |
| 2015/0269607 A1* | 9/2015 | Steube ............... G06Q 30/0244 705/14.43 |
| 2017/0055273 A1* | 2/2017 | Sharma ............... H04W 72/085 |
| 2017/0272831 A1* | 9/2017 | Keys .................. H04N 21/6106 |
| 2018/0255000 A1* | 9/2018 | Castinado ............ H04L 47/823 |

FOREIGN PATENT DOCUMENTS

| | | |
|---|---|---|
| CN | 101834724 A | 9/2010 |
| CN | 101867474 A | 10/2010 |
| CN | 102025491 A | 4/2011 |
| CN | 102664732 A | 9/2012 |
| CN | 103200000 A | 7/2013 |
| CN | 103200001 A | 7/2013 |
| CN | 103312498 A | 9/2013 |
| CN | 103338448 A | 10/2013 |
| CN | 104504601 A | 4/2015 |
| EP | 2462717 A1 | 6/2012 |
| KR | 100563907 B1 | 3/2006 |
| WO | 2010105993 A2 | 9/2010 |
| WO | 2015149035 A1 | 10/2015 |

* cited by examiner

COMPUTERIZED SYSTEM FOR PROVIDING RESOURCE DISTRIBUTION CHANNELS BASED ON PREDICTING FUTURE RESOURCE DISTRIBUTIONS

FIELD OF THE INVENTION

The present invention embraces a system for providing resource distribution channels based on predicting future resource distributions. The system typically includes a classical computer apparatus and a quantum optimizer in communication with the classical computer apparatus. The classical computer apparatus identifies resource transfer information related to a resource transfer of a user, wherein the user receives a resource collection as a result of the resource transfer. The quantum optimizer analyzes the resource transfer information to predict a future resource distribution of the resource collection. The classical computer apparatus then compares attributes of the future resource distribution to attributes of multiple resource distribution channels, identifies a resource distribution channel having attributes corresponding to the attributes of the future resource distribution, and transmits a command configured to cause a client application stored on a device of the user to display an interface having a selectable option for transferring the resource collection using the resource distribution channel.

BACKGROUND

During the processing of resource transfers significant volumes of data are often collected. Due to these significant volumes of data, it is often difficult to analyze this data in real-time.

SUMMARY

In one aspect, the present invention embraces a computerized system, and an associated method, for providing resource distribution channels based on predicting future resource distributions. The system typically includes a classical computer apparatus that includes: a processor; a memory; and a resource transfer processing application that is stored in the memory and executable by the processor. The system also typically includes a quantum optimizer in communication with the classical computer apparatus, the quantum optimizer including a quantum processor and a quantum memory. The resource transfer processing application is typically configured for: identifying resource transfer information related to a resource transfer of a user, wherein the user receives a resource collection as a result of the resource transfer; identifying user information related to the user; transmitting the resource transfer information and user information to the quantum optimizer; receiving, from the quantum optimizer, one or more attributes of a future resource distribution; retrieving attributes of a plurality of resource distribution channels from a resource distribution channel library; comparing the one or more attributes of the future resource distribution to the attributes of a plurality of resource distribution channels; based on comparing the one or more attributes of the future resource distribution to the attributes of the plurality of resource distribution channels, identifying a first resource distribution channel having attributes corresponding to the one or more attributes of the future resource distribution; and in response to identifying the first resource distribution channel, transmitting a command to a client application stored on a device of the user, the command being configured to cause the client application to display an interface including a selectable option for transferring the resource collection using the first resource distribution channel. The quantum optimizer is typically configured for: receiving the resource transfer information and user information from the classical computer apparatus; analyzing the resource transfer information and user information to predict the future resource distribution of the resource collection; and transmitting, to the classical computer apparatus, the one or more attributes of the future resource distribution.

In a first particular embodiment, the quantum optimizer is configured for analyzing the user information to generate a model for predicting future resource distributions, wherein the model is configured for real-time processing by the classical computer apparatus. In addition, the resource transfer processing application is configured for: identifying second resource transfer information related to a second resource transfer of the user, wherein the user receives a second resource collection as a result of the second resource transfer; analyzing the second resource transfer information and user information using the model to (i) predict a second future resource distribution of the second resource collection and (ii) determine a confidence level of the second future resource distribution; based on the confidence level of the second future resource distribution, comparing one or more attributes of the second future resource distribution to the attributes of the plurality of resource distribution channels; based on comparing the one or more attributes of the second future resource distribution to the attributes of the plurality of resource distribution channels, identifying a second resource distribution channel having attributes corresponding to the one or more attributes of the second future resource distribution; and in response to identifying the second resource distribution channel, transmitting a second command to the client application, the second command being configured to cause the client application to display an interface including a selectable option for transferring the second resource collection using the second resource distribution channel.

In a first aspect of the first particular embodiment, the resource transfer processing application is configured for: identifying third resource transfer information related to a third resource transfer of the user, wherein the user receives a third resource collection as a result of the third resource transfer; analyzing the third resource transfer information and user information using the model to (i) predict a third future resource distribution of the third resource collection and (ii) determine a confidence level of the third future resource distribution; based on the confidence level of the third future resource distribution, transmitting the third resource transfer information to the quantum optimizer; receiving, from the quantum optimizer, one or more attributes of a third future resource distribution; comparing the one or more attributes of the third future resource distribution to the attributes of the plurality of resource distribution channels; based on comparing the one or more attributes of the third future resource distribution to the attributes of the plurality of resource distribution channels, identifying a third resource distribution channel having attributes corresponding to the one or more attributes of the third future resource distribution; and in response to identifying the third resource distribution channel, transmitting a third command to the client application, the third command being configured to cause the client application to display an interface including a selectable option for transferring the third resource collection using the third resource distribution channel. In addition, the quantum optimizer is configured for: receiving the third resource transfer information from the classical computer apparatus; analyzing the third resource transfer information and user information to predict the third future resource distribution of the third resource collection; and transmitting, to the classical computer apparatus, the one or more attributes of the third future resource distribution.

In a second particular embodiment, either alone or in combination with the other particular embodiments, the resource transfer processing application is configured for monitoring, in real-time, resource transfers of the user. In addition, the resource transfer information related to the resource transfer of the user is identified in response to monitoring the resource transfers of the user.

In a third particular embodiment, either alone or in combination with the other particular embodiments, the user information related to the user includes information regarding previous resource transfers performed by the user.

In a fourth particular embodiment, either alone or in combination with the other particular embodiments, the user information related to the user includes information regarding an accuracy of previous resource distribution predictions made by the quantum optimizer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
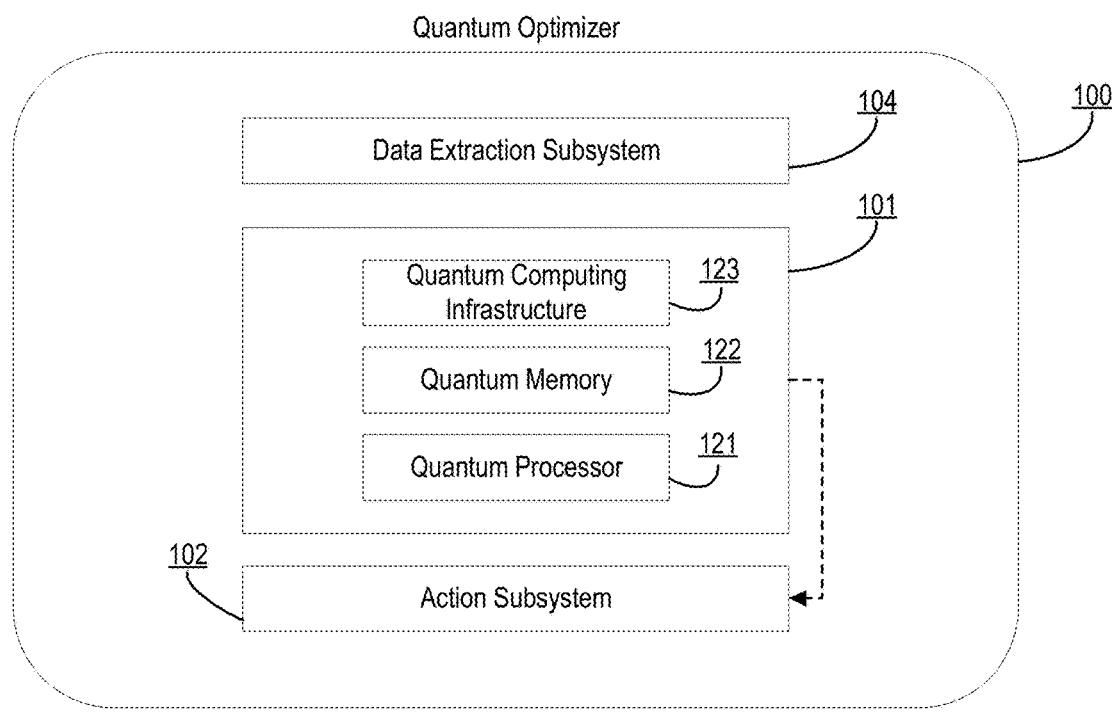
Figure 2:
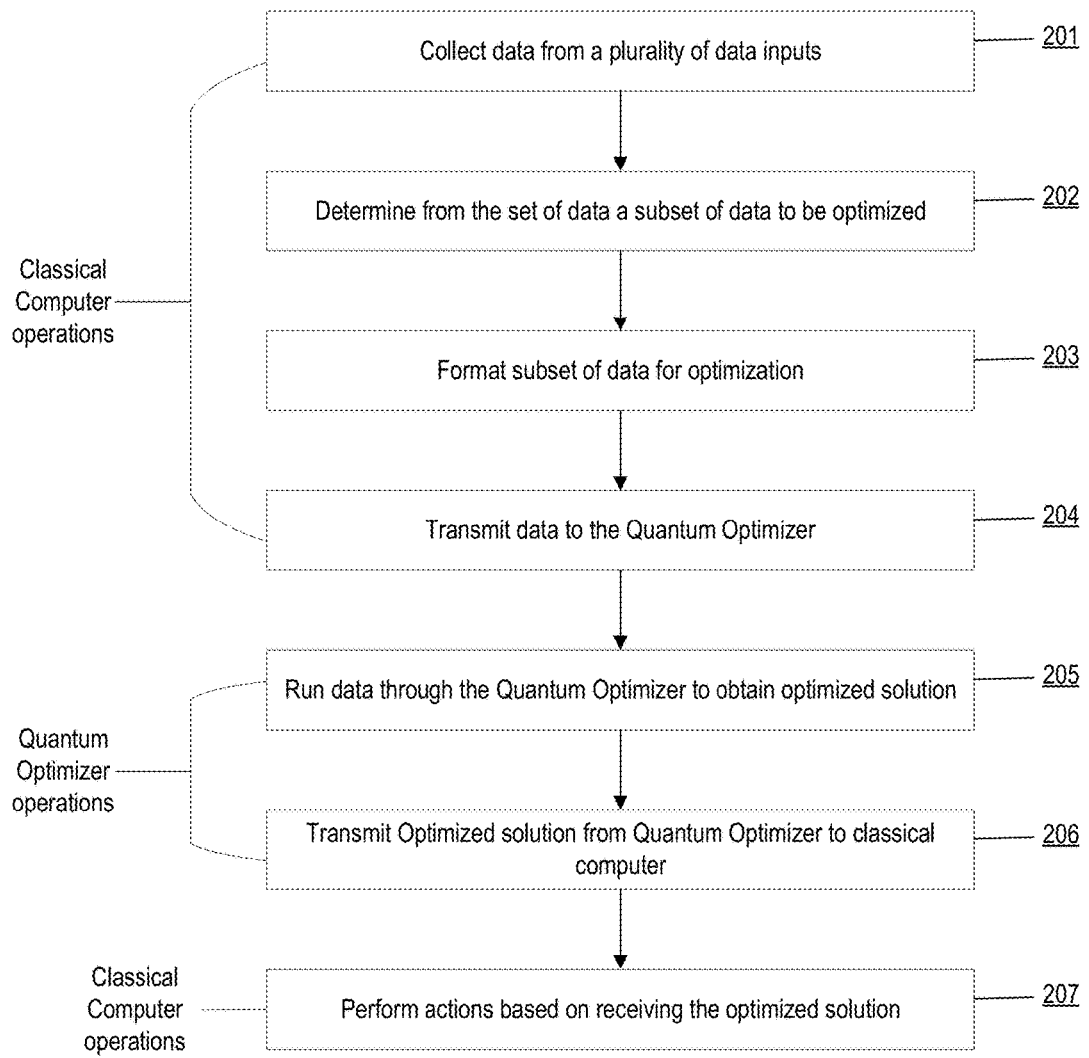
Figure 3:
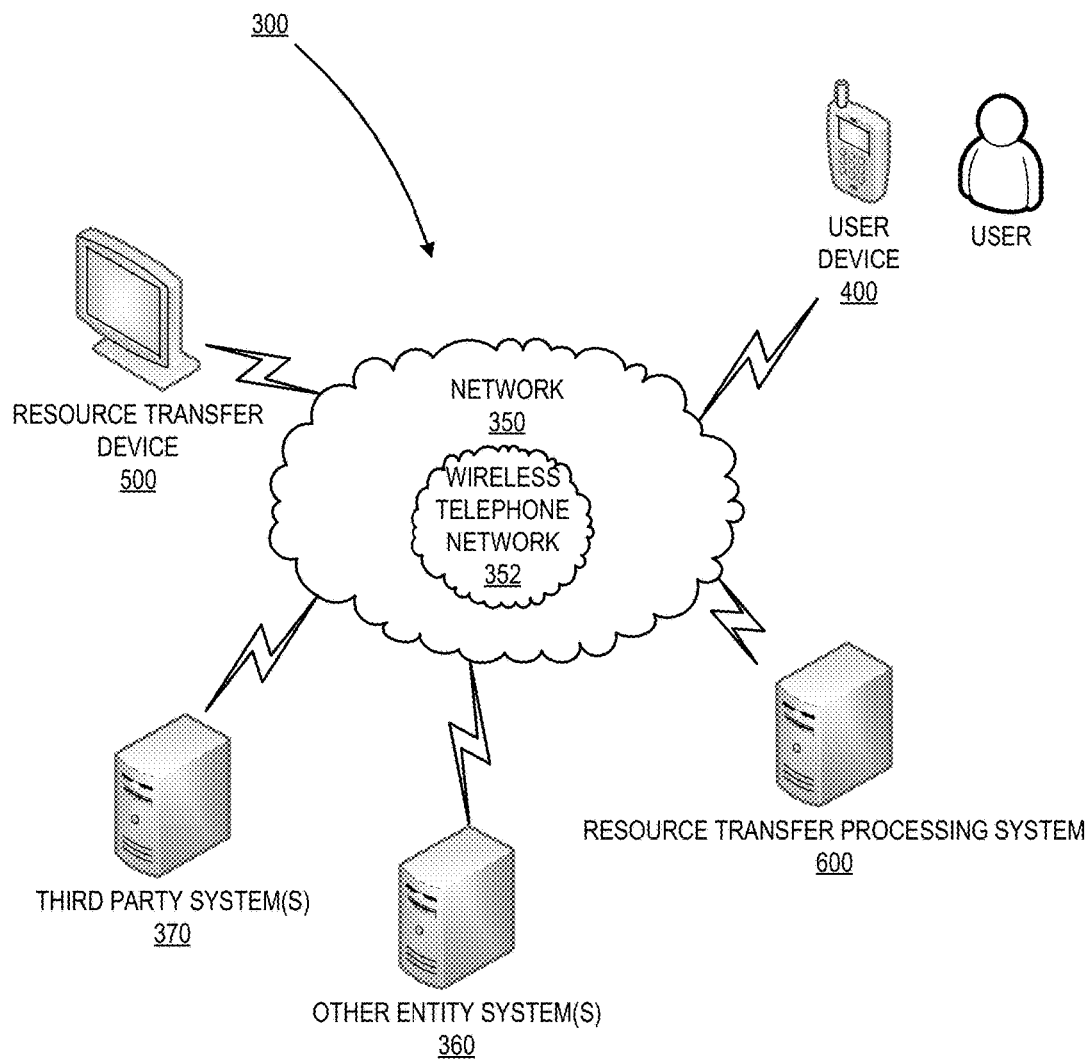
Figure 4:
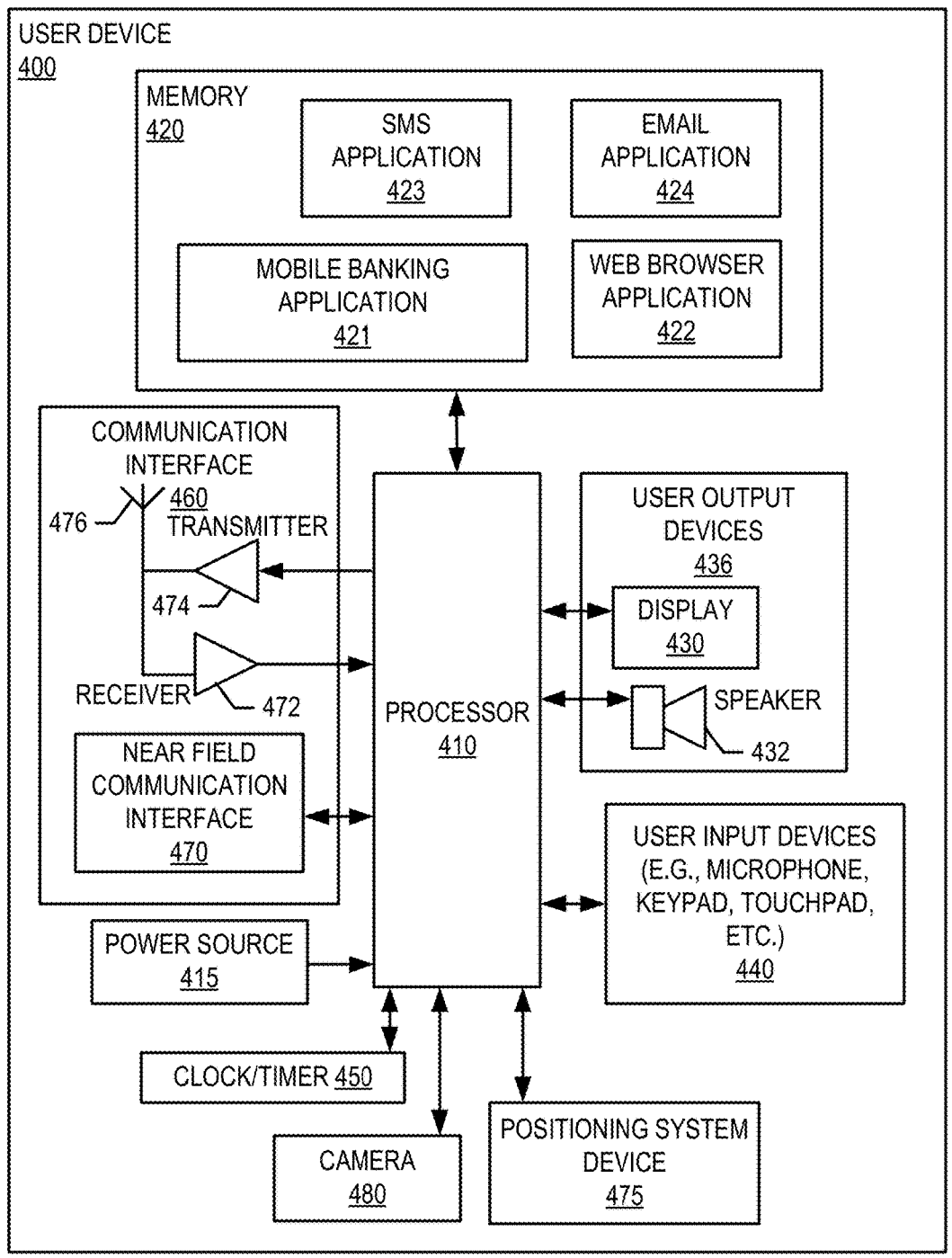
Figure 5:
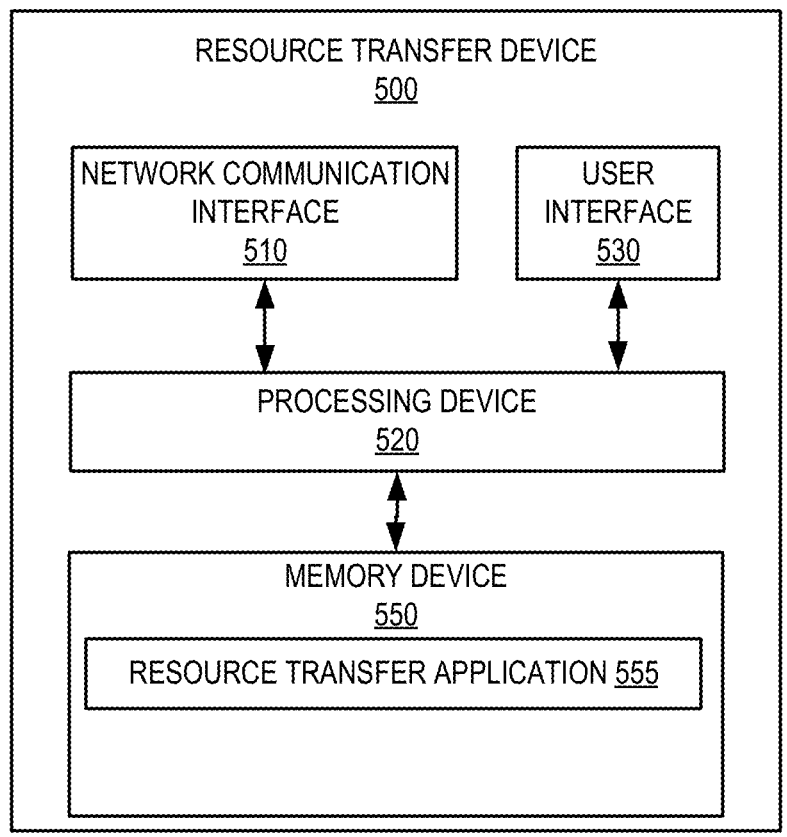
Figure 6:
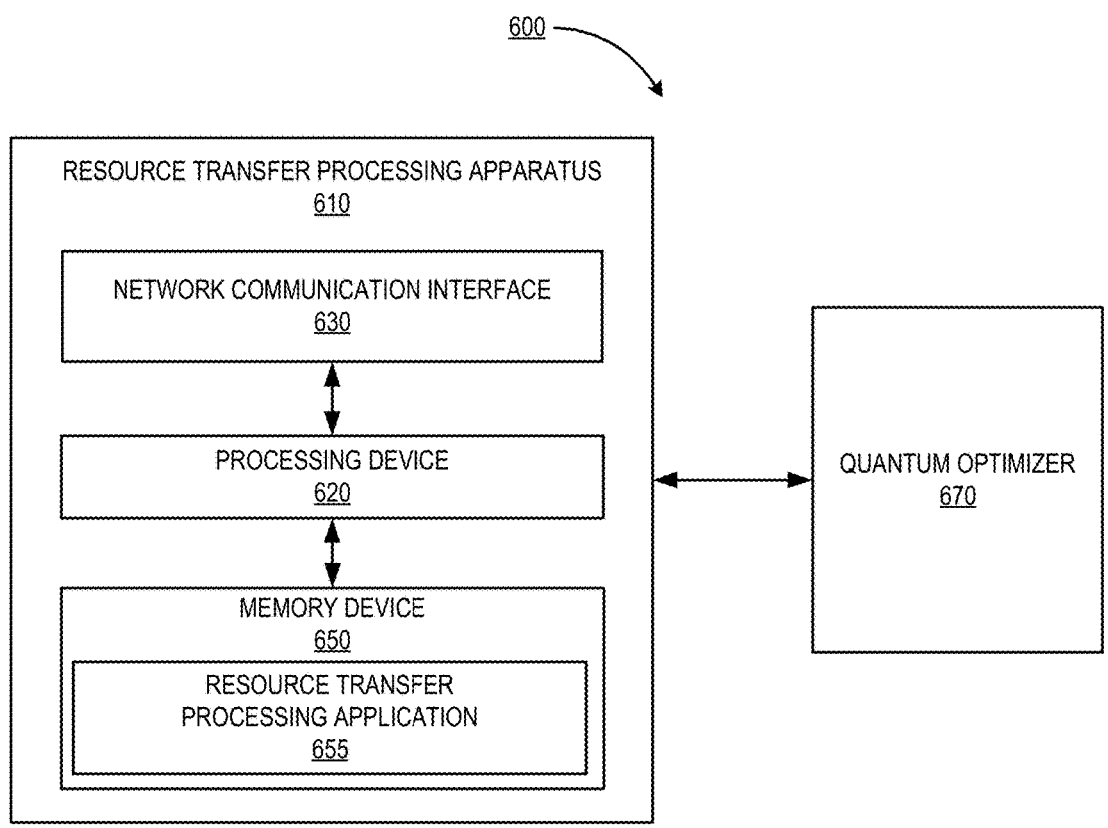
Figure 7A:
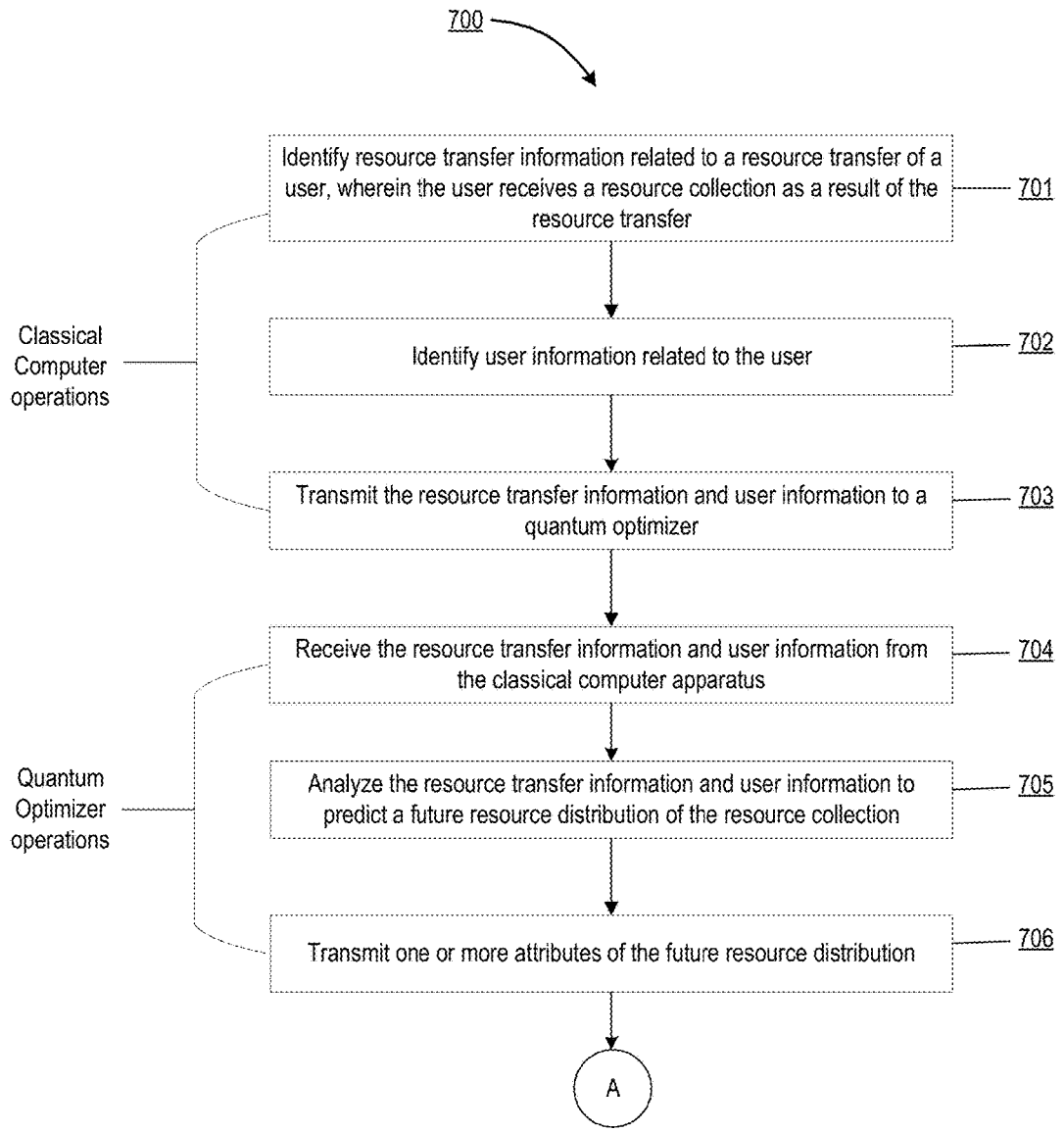
Figure 7B:
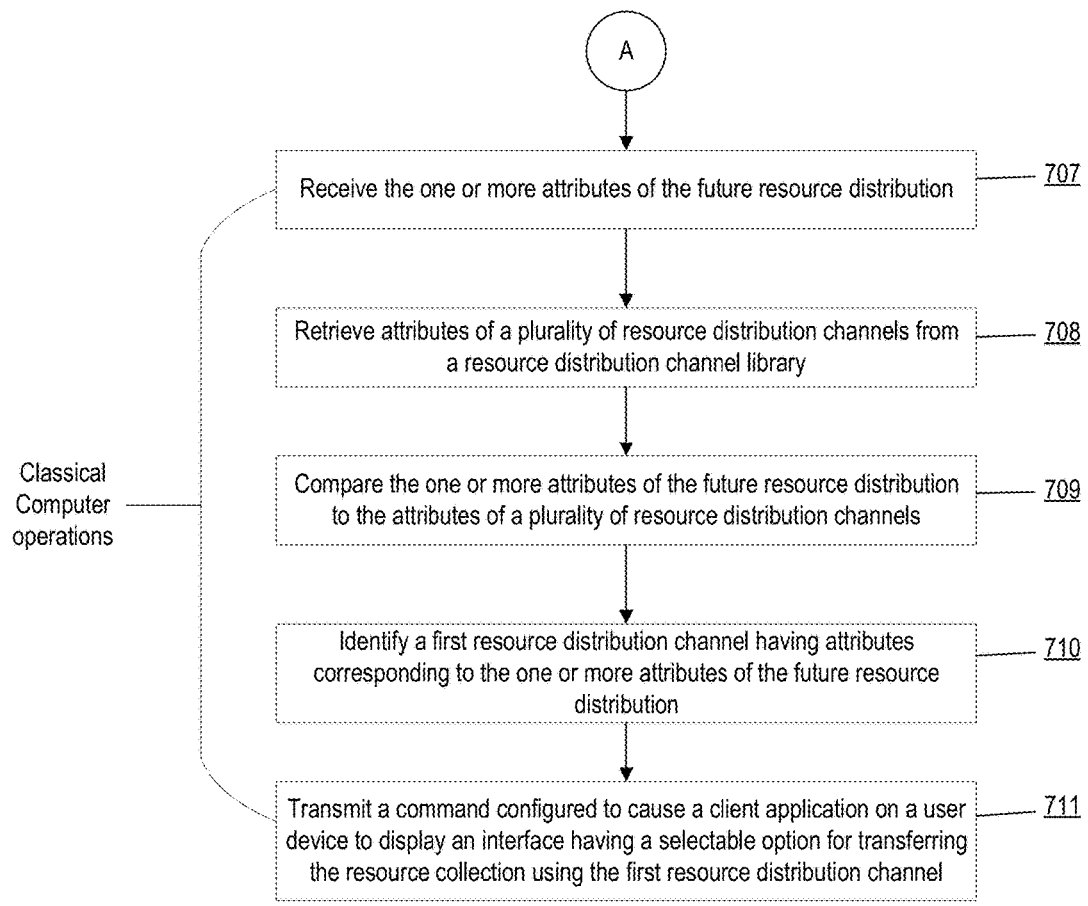

Having thus described embodiments of the invention in general terms, reference will now be made the accompanying drawings, wherein:

FIG. 1 is a schematic diagram of an exemplary quantum optimizer that can be used in parallel with a classical computer to solve optimization problems;

FIG. 2 depicts a method of solving optimization problems by using a classical computer in conjunction with a quantum optimizer;

FIG. 3 depicts an operating environment in accordance with an aspect of the present invention;

FIG. 4 schematically depicts a user device in accordance with an aspect of the present invention;

FIG. 5 schematically depicts a resource transfer device in accordance with an aspect of the present invention;

FIG. 6 schematically depicts a resource transfer processing system in accordance with an aspect of the present invention FIGS. 7A-7B depict a method for providing resource distribution channels based on predicting future resource distributions in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

FIG. 1 is a schematic diagram of an exemplary Quantum Optimizer 100 that can be used in parallel with a classical computer to solve optimization problems. The Quantum Optimizer 100 typically includes a Data Extraction Subsystem 104, a Quantum Computing Subsystem 101, and an Action Subsystem 102. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the Data Extraction Subsystem 104 communicates with the network to extract data for optimization. It will be understood that any method of communication between the Data Extraction Subsystem 104 and the network is sufficient, including but not limited to wired communication, Radiofrequency (RF) communication, Bluetooth®, WiFi, and the like. The Data Extraction Subsystem 104 then formats the data for optimization in the Quantum Computing Subsystem.

As further depicted in FIG. 1, the Quantum Computing Subsystem 101 includes a Quantum Computing Infrastructure 123, a Quantum Memory 122, and a Quantum Processor 121. The Quantum Computing Infrastructure 123 includes physical components for housing the Quantum Processor 121 and the Quantum Memory 122. The Quantum Computer Infrastructure 123 further includes a cryogenic refrigeration system to keep the Quantum Computing Subsystem 101 at the desired operating temperatures. In general, the Quantum Processor 121 is designed to perform adiabatic quantum computation and/or quantum annealing to optimize data received from the Data Extraction Subsystem 104. The Quantum Memory 122 typically includes a plurality of qubits used for storing data during operation of the Quantum Computing Subsystem 101. In general, qubits are any two-state quantum mechanical system. It will be understood that the Quantum Memory 122 may include any such two-state quantum mechanical system, such as the polarization of a single photon, the spin of an electron, and the like.

The Action Subsystem 102 communicates the optimized data from the Quantum Computing Subsystem 101 over the network. It will be understood that any method of communication between the Data Extraction Subsystem 104 and the network is sufficient, including but not limited to wired communication, Radiofrequency (RF) communication, Bluetooth®, WiFi, and the like.

FIG. 2 depicts a method of solving optimization problems by using a classical computer in conjunction with a quantum optimizer. As depicted in FIG. 2, a classical computer begins the method at step 201 by collecting data from a plurality of inputs. At step 202, the classical computer then determines from the set of data collected at step 201 a subset a data to be optimized. The classical computer then formats the subset of data for optimization at step 203. At step 204, the classical computer transmits the formatted subset of data to the Quantum Optimizer. The Quantum Optimizer runs the data to obtain the optimized solution at 205. The Quantum Optimizer then transmits the optimized data back to the classical computer at step 206. Finally, the classical computer can perform actions based on receiving the optimized solution at step 207.

In one aspect, the present invention embraces a method of providing resource distribution channels based on predicting future resource distributions.

An entity that processes resource transfers typically obtains a significant volume of data regarding resource transfers as well as regarding parties initiating or receiving a resource transfer. Using this data, the entity may be able to predict future uses of resources obtained by a recipient of a resource transfer. That said, the volumes of data obtained by an entity may be significant is so it may be difficult to process the data, particularly in real time, to identify patterns that may be used to predict futures uses of resources. In order to address these technical problems, the present invention employs a quantum optimizer, instead of a classical computer, to process data related to resource transfers in order to predict future uses (e.g., future distributions) of resources. By employing a quantum optimizer in this manner, the present invention is able to process vast volumes of data, even in real-time (e.g., within a few seconds of a particular resource transfer).

In some embodiments, an "entity" as used herein may be any institution employing information technology resources and particularly technology infrastructure configured for large scale processing of resource transfers. As such, the entity may be any institution, group, association, financial institution, establishment, company, union, authority or the like, employing information technology resources for the processing of resource transfers.

As described herein, a "user" may be an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a party (e.g., an individual or organization) sending, receiving, or otherwise involved with a resource transfer.

In the instances where the entity is a financial institution, a user may be an individual or entity with one or more relationships affiliations or accounts with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. An account may be associated with and/or maintained by an entity.

As used herein, a "resource transfer," "resource distribution," or "transaction", may refer to any activities or communication between a user and the entity, activities or communication between multiple entities/users, communication between technology applications and the like. A resource transfer or resource distribution may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

FIG. 3 provides a block diagram illustrating an operating environment 300, in accordance with an embodiment of the present invention. As illustrated in FIG. 3, the operating environment 300 typically includes a user device 400, a resource transfer device 500, and a resource transfer processing system 600. The resource transfer processing system 600 is typically maintained by an entity (e.g., financial institution) that processes resource transfers. The user device 400 and/or resource transfer device 500 may be configured to initiate a resource transfer request. This resource transfer request is then transmitted (either directly or indirectly) over a network 350 to the resource transfer processing system 600 for processing. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352. The resource transfer processing system 600 may also be in network communication with other devices, such as other entity systems 360 and/or third party systems 370, which may also process aspects of a resource transfer request or otherwise facilitate a resource transfer.

FIG. 4 provides a block diagram illustrating the user device 400 of FIG. 3 in more detail, in accordance with embodiments of the invention. In some embodiments, the user device 400 is a mobile device, such as mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned. In addition, the user device 400 may be a computing device that is not a mobile device, such as a desktop computer.

The user device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the user device 400. For example, the processor 410 may include a digital signal processor device, a microprocessor device, and various analog to digital converters, digital to analog converters, and/or other support circuits. Control and signal processing functions of the user device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the user device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 350. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 352. In this regard, the user device 400 may be configured to operate with one or more air interface standards, communication protocols, modulation types, and access types. By way of illustration, the user device 400 may be configured to operate in accordance with any of a number of first, second, third, and/or fourth-generation communication protocols and/or the like. For example, the user device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the user device 400. In some embodiments, the NFC interface 470 is not supported in and/or on the user device 400, but the NFC interface 470 is otherwise operatively connected to the user device 400 (e.g., where the NFC interface 470 is a peripheral device plugged into the user device 400). Other apparatuses having NFC interfaces mentioned herein may be configured similarly. In some embodiments, the NFC interface 470 of the user device 400 is configured to contactlessly and/or wirelessly communicate information to and/or from a corresponding NFC interface of another apparatus (e.g., another mobile or computing device).

The user device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the user device 400 to receive data from a user, may include any of a number of devices allowing the user device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The user device 400 may also include a positioning system device 475 that is configured to be used by a positioning system to determine a location of the user device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the user device 400. In other embodiments, the positioning system device 475 includes a proximity sensor or transmitter, such as an RFID tag, that can sense or be sensed by devices known to be located proximate a location to determine that the user device 400 is located proximate these known devices.

The user device 400 further includes a power source 415, such as a battery, for powering various circuits and other devices that are used to operate the user device 400. Embodiments of the user device 400 may also include a clock or other timer 450 configured to determine and, in some cases, communicate actual or relative time to the processor 410 or one or more other devices.

The user device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the user device 400 described herein. For example, the memory 420 may include such applications as a conventional web browser application 422 and/or a mobile banking application 421. These applications also typically provide a graphical user interface (GUI) on the display 430 that allows the user to communicate with the user device 400, the resource transfer processing system 600, and/or other devices or systems. In one embodiment of the invention, when the user decides to enroll in an online banking program, the user downloads or otherwise obtains the mobile banking system client application from an entity system (e.g., an application server). In other embodiments of the invention, the user interacts with the resource transfer processing system 600 via the web browser application 422 in addition to, or instead of, the mobile banking application 421. The user of the user device 400 may use the web browser application 422 and/or the mobile banking application 421 to initiate a resource transfer.

The memory 420 can also store any of a number of pieces of information, and data, used by the user device 400 and the applications and devices that make up the user device 400 or are in communication with the user device 400 to implement the functions of the user device 400 and/or the other systems described herein. For example, the memory 420 may include such data as user authentication information.

The resource transfer device 500 is typically a device that facilitate execution of financial transactions. In some instances, the resource transfer device 500 includes a transaction terminal. In this regard the transaction terminals can include Automated Teller Machines (ATMs), Point of sale devices (POS), vending machines, checkout registers, ticket vending machines, automated retail transaction devices, banking terminals in a financial institution and other transaction terminals that facilitate transactions in one form or another. In some embodiments, the resource transfer device 500 facilitates execution of both financial and non-financial transactions/activities. In some embodiments, the resource transfer device 500 requires a user to perform one or more authentication steps based on the level of authorization desired for a particular transaction. For example, the user may be required to slide cards with magnetic strips, provide one or more account numbers, userID and the like and the accompanying personal identification numbers (PIN), passwords, CVV numbers associated with the individual transaction terminal, provide biometric information, perform audio or visual challenges and the like.

Referring now to FIG. 5, the resource transfer device 500 includes various features, such as a network communication interface 510, a processing device 520, a user interface 530, and a memory device 550. The network communication interface 510 includes a device that allows the resource transfer device 500 to communicate over the network 350 (shown in FIG. 3). In one embodiment of the invention, a resource transfer application 555 allows a user to perform a resource transfer/transaction and to communication with various other devices/system to facilitate performance of the resource transfer/transaction.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a user to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the customer or output data to the customer. These input and output devices may include a display, mouse, keyboard, button, touchpad, touch screen, microphone, speaker, LED, light, joystick, switch, buzzer, bell, and/or other customer input/output device for communicating with one or more users.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

In some embodiments, the resource transfer device 500 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to facilitate transactions with users utilizing an external apparatus, for example, the user device 400, capable of contactless communication. Also, it will be understood that the contactless interface may be embedded, built, carried, and/or otherwise supported in and/or on the resource transfer device 500. In some embodiments, the contactless interface is not supported in and/or on the resource transfer device 500, but is otherwise operatively connected to the resource transfer device 500 (e.g., where the contactless interface is a peripheral device plugged into the resource transfer device 500). The contactless interface of the resource transfer device 500 may be configured to contactlessly and/or wirelessly communicate information to and/or from an external apparatus (e.g., the user device 400).

The resource transfer device 500, may further include one or more additional devices to help execute transactions. For example the additional devices may be physical devices like printers to print documents, information, confirmation slips and the like; devices to store and retrieve one or more products dispensed at the resource transfer device 500; scanning devices to scan and retrieve data from received documents; ports to receive physical documents; image and video capture devices to help identify and authenticate the user; scanners to receive and process biometric identification credentials like fingerprint identification and voice identification. In some embodiments the resource transfer device 500 are configured to authenticate the user based on establishing an operative communication channel with the user device 400. For instance, the resource transfer device 500 may transmit signal with encoded data specific to a user device 400 that other devices cannot recognize and/or decode. The user device 400 may receive the encoded data and a specific decoding module of the user device may decode the signal and transmit an augmented signal to a receiver on the resource transfer device 500. The augmented signal may include the decoded signal along with a token identifier of the device 400, one or more user parameters (such as authentication credentials, or indication of a successful validation of credentials received at the device 400, such as the user's fingerprint or passcode) and the like. In some embodiments, the user device 400 and/or the token are associated with one or more financial institution accounts. The resource transfer device 500 (optionally in conjunction with another system), may then analyze the augmented signal and authenticate the user based on authenticating the user device 400, and allow the user to conduct a transaction without seeking additional authentication credentials.

FIG. 6 depicts the resource transfer processing system 600 is more detail. The resource transfer processing system 600 typically includes a resource transfer processing apparatus 610. The resource transfer processing apparatus 610 is typically a classical computer that includes a network communication interface 630, a processing device 650, and a memory device 650. The resource transfer processing apparatus 610 also typically includes a resource transfer processing application 655 that is configured to perform various aspects of processing a resource transfer as described herein. In order to predict future resource distributions of resources obtained by a recipient of a resource transfer, the resource transfer processing apparatus 610 is typically in communication with a quantum optimizer 670. The quantum optimizer is typically configured to perform various aspects of predicting future resource distributions as described herein. An exemplary quantum optimizer is depicted in more detail in FIG. 1.

Referring now to FIGS. 7A-7B, a method 700 is provided for providing resource distribution channels based on predicting future resource distributions. This method 700 may be performed by the resource transfer processing system 600.

Initially, at block 701, the resource transfer processing apparatus 610, which as previously noted is typically a classical computer (e.g., a binary, digital electronic computer), identifies information related to a resource transfer (e.g., transaction) of a user. The user is typically a recipient of the resource transfer. In other words, the user typically receives a resource collection (e.g., a group of resources) as a result of the resource transfer. In some instances, the user maintains an account provided by the entity, and resources are being added to the account of the user. As used herein, a "resource" or "resource collection" may be any property of the user. By way of example, a "resource" or "resource collection" may be funds in an account of the user. The resource transfer information typically includes various types of data related to the resource transfer, such as transferor, transferee, account information regarding account involved in the resource transfer, amount of the transfer, location of a device initiating the transfer, and the like. In some embodiments, the resource transfer processing apparatus 610 obtains the resource transfer information in performing one or steps of processing the resource transfer. In this regard, the resource transfer processing apparatus 610 may have received a resource transfer request from the resource transfer device 500. In other embodiments, the resource transfer processing apparatus 610 might not have engaged in processing the resource transfer, but instead obtains resource transfer information from another entity or third part system that processed the resource transfer. In other embodiments, the resource transfer processing apparatus 610 may identify (e.g., predict) a future resource transfer of the user. In this regard, the resource transfer processing apparatus 610 may be able to predict the resource transfer based on the user's history of receiving resource transfers. For example, if the user has a history of receiving bi-monthly payroll payments and/or annual bonuses from the user's employer, the resource transfer processing apparatus 610 may use this historic information to predict the amount and timing of a future payroll payment or bonus.

In some embodiments, the resource transfer processing apparatus 610 may be configured to monitor, in real time, resources transfers of the user. Accordingly, the resource transfer may be identified in the course of this real-time monitoring.

At block 702, the resource transfer processing apparatus 610 identifies other information related to the user. This user information may be any information (in addition to the previously mentioned resource transfer information) that may be helpful in predicting how the user may use resources obtained from the resource transfer in the future. According, the user information may include: information regarding the user's resources (e.g., accounts, real property, personal property, and the like), the user's transaction history, the user's current location, the user's usual zone of travel, the user's interests, information regarding the environment in which the user is located, and the like. The user information may include information regarding how accurate previous predictions made by the quantum optimizer 670 regarding the user have been.

At block 703, the resource transfer processing apparatus 610 transmits the resource transfer information and the user information to the quantum optimizer 670. In some embodiments, the resource transfer processing apparatus 610 may format this information for optimization by the quantum optimizer 670 before transmitting this information to the quantum optimizer 670.

At block 704, the quantum optimizer 670 receives the quantum optimizer 670 from the resource transfer processing apparatus 610.

Next, at block 705, the quantum optimizer 670 analyzes the resource transfer information and the user information to predict a future resource distribution (e.g., a future transfer) of the resource collection that the user receives as a result of the resource transfer. In particular, the quantum optimizer 670 typically performs adiabatic quantum computation and/or quantum annealing using the resource transfer information and the user information to predict the most likely future use of the resource collection the user receives as a result of the resource transfer. For example, based on data regarding the user's transaction history and interests, the quantum optimizer 670 may determine that the most likely use of the resource collection obtained (or to be obtained) by the user from the resource transfer is purchasing a certain resource (e.g., a good or service). The quantum optimizer 670 may also predict when the user is mostly like to make the future resource distribution.

At block 706, the quantum optimizer 670 transmits attributes of the predicted future resource distribution to the resource transfer processing apparatus 610. These attributes include information regarding the predicted future resource distribution, such as the type of resource, the amount of the predicted future resource distribution, the time period in which the future resource distribution is most likely to be make, and the like.

At block 707, the resource transfer processing apparatus 610 receives the attributes of the future resource distribution.

At block 708, the resource transfer processing apparatus 610 retrieves attributes of a plurality of resource distribution channels from a resource distribution channel library. As used herein a "resource distribution channel" is a way in which the user may utilize the resource collection (e.g., as an alternative to the predicted future resource distribution). In this regard, a resource distribution channel may be an offer to utilize the resource collection in a resource transfer, such as an offer to purchase particular goods or services, make an investment, and the like. The resource distribution channel library is typically a collection of different resource distribution channels that may have been defined by the entity and/or provided to the entity by a third party. The resource distribution channel library may be stored in memory device 650 of the resource transfer processing apparatus 610, on another entity system, or on a third party system. The attributes of the plurality of resource distribution channels typically includes information regarding at least the type of resource(s) provided through each resource distribution channel and may include other information.

At block 709, the resource transfer processing apparatus 610 compares the attributes of the predicted future resource distribution with the attributes of the plurality of resource distribution channels. By comparing the attributes of the predicted future resource distribution with the attributes of the plurality of resource distribution channels, the resource transfer processing apparatus 610, at block 710, is typically able to identify at least one resource distribution channel having attributes corresponding to (e.g., similar to) the attributes of the predicted future resource distribution. For example, if the quantum optimizer 670 predicted that the user would use the resource collection to purchase a particular good, the resource transfer processing apparatus 610 may identify one or more resource distribution channels (from the resource distribution channel library) that relate to offers for similar types of goods. By way of further example, if the quantum optimizer 670 predicted that the user would use the resource collection to make an investment, the resource transfer processing apparatus 610 may identify offers for similar investments contained in the resource distribution channel library. In the event the resource transfer processing apparatus 610 identifies multiple resource distribution channels having attributes that are similar to the attributes of the predicted future resource distribution, the resource transfer processing apparatus 610 may select the most similar resource distribution channel. Alternatively, the resource transfer processing apparatus 610 may provide (at block 711) multiple identified resource distribution channels.

Once the resource transfer processing apparatus 610 identifies a particular resource distribution channel from the resource distribution channel library, the resource transfer processing apparatus 610 provides information regarding the identified resource distribution channel(s) to the user. In this regard, the resource transfer processing apparatus 610 typically transmits a command to a client application stored on a device of the user (e.g., user device 400), the command being configured to cause the client application to display (e.g., on a display of the user device) an interface (e.g., a graphical user interface) having a selectable option (e.g., a button) for transferring the resource collection (or at least a portion of the resource collection) using the identified resource distribution channel. For example, if the identified resource distribution channel includes an offer to purchase a particular product, the resource transfer processing apparatus 610 may cause the client application to display an interface that includes the offer. If the user selects the offer, the resource transfer processing apparatus 610 may then facilitate a resource transfer (e.g., transaction) corresponding to the selected offer.

In some embodiments, the identified resource distribution channel may be an offer to invest the resource collection. In this regard, the resource transfer processing system 600 may considered to identify an optimal investment for the user. In this regard, the quantum optimizer 670 may project the future performance of different investments (e.g., securities) and then select an optimal group of investments based on projected performance and attributes of the user, such as the user's future needs (e.g., amount, timeframe, and the like), the user's other investments, the user's willingness to be exposed to market volatility, and the like.

Typically, the steps of the method 700 are performed in real-time or near real-time. In other words, these steps are typically performed within a few seconds or a few minutes of the resource transfer processing system 600 identifying the resource transfer. This real-time or near real-time performance is facilitated by using the quantum optimizer 670, instead of a classical computer, to analyze the resource transfer information and user information to predict a future resource distribution of the resource collection the user receives as a result of the resource transfer. By predicting future resource distributions in this manner, the resource transfer processing system 600 is able to provide information regarding alternative resource distribution channels (e.g., offers) that may be of interest to the user and provide such alternative resource distribution channels when the user is likely to be interested in them.

In some instances, while it is desirable to provide information regarding alternative resource distribution channels in real-time, it may also be desirable to minimize usage of the quantum optimizer 670 (e.g., due to cost of use, availability, demand by other systems to use the quantum optimizer 670, and the like. Accordingly, the quantum optimizer 670 may also be configured to analyze the resource transfer information and the user information (e.g., the information received at block 704) to generate a model for predicting future resource distributions, where the model is configured for real-time processing by a classical computer (e.g., by the resource transfer processing apparatus 610). Because the model is typically configured for real-time processing by a classical computer (e.g., processing within a few seconds or less), the model typically provides a less accurate prediction than would be provided by using the quantum optimizer 670 to make the prediction. The second model is also typically configured to predict a future resource distribution of a resource collection as well as to determine a confidence level of the predicted future resource distribution. When the confidence level is relatively high, the model is expected to provide a sufficiently accurate prediction. However, when the confidence level is not high, the prediction provided by the model is likely unreliable.

Once the model has been created by the quantum optimizer 670, the model is typically provided to the resource transfer processing apparatus 610. Thereafter, when the resource transfer processing apparatus 610 identifies a resource transfer, the resource transfer processing apparatus 610 initially analyzes resource transfer information and user information using the model. If the confidence level provided by the model is relatively high (e.g. by comparing the confidence level to a defined threshold), then the resource transfer processing apparatus 610 uses the attributes of the future resource distribution predicted by the model to find a corresponding alternative resource distribution channel (e.g., by comparing these attributes to the attributes of the resource distribution channels retrieved from the resource distribution channel library). However, if the confidence level provided by the model is not high, then the resource transfer processing apparatus 610 transmits the resource transfer information and user information to the quantum optimizer 670 as previously described. By initially evaluating the resource transfer information and user information using the model (which may be processed in real-time by a classical computer), and then evaluating the resource transfer information and user information using the quantum optimizer if the confidence level provided by the model is not high, the system is able to provide a real-time (or near real-time) prediction of a future resource distribution, while minimizing the usage of the quantum optimizer.

As evident from the preceding description, the system described herein represents an improvement in technology by using a quantum optimizer, instead of a classical computer, to analyze resource transfer information and user information to predict a future resource distribution of the resource collection the user receives as a result of the resource transfer. Moreover, by initially evaluating resource transfer information and user information using a model that may be processed in real-time by a classical computer, and then evaluating the resource transfer information and user information using a quantum optimizer if the confidence level provided by the classical-computer model is not high, future resource distributions may be predicted in real-time or near real-time, while minimizing the usage of the quantum optimizer.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer system for providing resource distribution channels based on predicting future resource distributions, comprising:
　　a classical computer apparatus comprising:
　　　　a processor;
　　　　a memory; and
　　　　a resource transfer processing application that is stored in the memory and executable by the processor;
　　a quantum optimizer in communication with the classical computer apparatus, the quantum optimizer comprising:
　　　　a quantum processor; and
　　　　a quantum memory;
　　wherein the resource transfer processing application is configured for:
　　　　monitoring, in real-time, resource transfers of a user;
　　　　identifying, based on said monitoring, resource transfer information related to a resource transfer of the user, wherein the user receives a resource collection as a result of the resource transfer;
　　　　identifying user information related to the user;
　　　　transmitting the resource transfer information and user information to the quantum optimizer;
　　　　receiving, from the quantum optimizer, one or more attributes of a future resource distribution;
　　　　retrieving attributes of a plurality of resource distribution channels from a resource distribution channel library;
　　　　comparing the one or more attributes of the future resource distribution to the attributes of a plurality of resource distribution channels;
　　　　based on comparing the one or more attributes of the future resource distribution to the attributes of the plurality of resource distribution channels, identifying a first resource distribution channel having attributes corresponding to the one or more attributes of the future resource distribution; and
　　　　in response to identifying the first resource distribution channel, transmitting a command to a client application stored on a device of the user, the command being configured to cause the client application to display an interface comprising a selectable option for transferring the resource collection using the first resource distribution channel;
　　wherein the quantum optimizer is configured for:
　　　　receiving the resource transfer information and user information from the classical computer apparatus;
　　　　analyzing the resource transfer information and user information to predict the future resource distribution of the resource collection; and
　　　　transmitting, to the classical computer apparatus, the one or more attributes of the future resource distribution.

2. The computer system of claim 1, wherein:
　　the quantum optimizer is configured for:
　　　　analyzing the user information to generate a model for predicting future resource distributions, wherein the model is configured for real-time processing by the classical computer apparatus;
　　the resource transfer processing application is configured for:
　　　　identifying second resource transfer information related to a second resource transfer of the user, wherein the user receives a second resource collection as a result of the second resource transfer;
　　　　analyzing the second resource transfer information and user information using the model to (i) predict a second future resource distribution of the second resource collection and (ii) determine a confidence level of the second future resource distribution;
　　　　based on the confidence level of the second future resource distribution, comparing one or more attributes of the second future resource distribution to the attributes of the plurality of resource distribution channels;
　　　　based on comparing the one or more attributes of the second future resource distribution to the attributes of the plurality of resource distribution channels, identifying a second resource distribution channel having attributes corresponding to the one or more attributes of the second future resource distribution; and
　　　　in response to identifying the second resource distribution channel, transmitting a second command to the client application, the second command being configured to cause the client application to display an interface comprising a selectable option for transferring the second resource collection using the second resource distribution channel.

3. The computer system of claim 2, wherein:
　　the resource transfer processing application is configured for:
　　　　identifying third resource transfer information related to a third resource transfer of the user, wherein the user receives a third resource collection as a result of the third resource transfer;
　　　　analyzing the third resource transfer information and user information using the model to (i) predict a third future resource distribution of the third resource collection and (ii) determine a confidence level of the third future resource distribution;
　　　　based on the confidence level of the third future resource distribution, transmitting the third resource transfer information to the quantum optimizer;
　　　　receiving, from the quantum optimizer, one or more attributes of a third future resource distribution;
　　　　comparing the one or more attributes of the third future resource distribution to the attributes of the plurality of resource distribution channels;
　　　　based on comparing the one or more attributes of the third future resource distribution to the attributes of the plurality of resource distribution channels, identifying a third resource distribution channel having attributes corresponding to the one or more attributes of the third future resource distribution; and
　　　　in response to identifying the third resource distribution channel, transmitting a third command to the client application, the third command being configured to cause the client application to display an interface comprising a selectable option for transferring the third resource collection using the third resource distribution channel;
　　the quantum optimizer is configured for:
　　　　receiving the third resource transfer information from the classical computer apparatus;
　　　　analyzing the third resource transfer information and user information to predict the third future resource distribution of the third resource collection; and transmitting, to the classical computer apparatus, the one or more attributes of the third future resource distribution.

4. The computer system of claim 1, wherein the user information related to the user comprises information regarding previous resource transfers performed by the user.

5. The computer system of claim 1, wherein the user information related to the user comprises information regarding an accuracy of previous resource distribution predictions made by the quantum optimizer.

6. A non-transitory computer-readable storage medium having computer-executable instructions for:
   monitoring, in real-time, resource transfers of a user;
   identifying, based on said monitoring, resource transfer information related to a resource transfer of the user, wherein the user receives a resource collection as a result of the resource transfer;
   identifying user information related to the user;
   transmitting the resource transfer information and user information to a quantum optimizer;
   receiving, from the quantum optimizer, one or more attributes of a future resource distribution;
   retrieving attributes of a plurality of resource distribution channels from a resource distribution channel library;
   comparing the one or more attributes of the future resource distribution to the attributes of a plurality of resource distribution channels;
   based on comparing the one or more attributes of the future resource distribution to the attributes of the plurality of resource distribution channels, identifying a first resource distribution channel having attributes corresponding to the one or more attributes of the future resource distribution; and
   in response to identifying the first resource distribution channel, transmitting a command to a client application stored on a device of the user, the command being configured to cause the client application to display an interface comprising a selectable option for transferring the resource collection using the first resource distribution channel;
   wherein the quantum optimizer is configured for:
     receiving the resource transfer information and user information from a classical computer apparatus;
     analyzing the resource transfer information and user information to predict the future resource distribution of the resource collection; and
     transmitting, to the classical computer apparatus, the one or more attributes of the future resource distribution.

7. The non-transitory computer-readable storage medium of claim 6, wherein:
   the quantum optimizer is configured for:
     analyzing the user information to generate a model for predicting future resource distributions, wherein the model is configured for real-time processing by the classical computer apparatus;
   the non-transitory computer-readable storage medium has computer-executable instructions for:
     identifying second resource transfer information related to a second resource transfer of the user, wherein the user receives a second resource collection as a result of the second resource transfer;
     analyzing the second resource transfer information and user information using the model to (i) predict a second future resource distribution of the second resource collection and (ii) determine a confidence level of the second future resource distribution;
     based on the confidence level of the second future resource distribution, comparing one or more attributes of the second future resource distribution to the attributes of the plurality of resource distribution channels;
     based on comparing the one or more attributes of the second future resource distribution to the attributes of the plurality of resource distribution channels, identifying a second resource distribution channel having attributes corresponding to the one or more attributes of the second future resource distribution; and
     in response to identifying the second resource distribution channel, transmitting a second command to the client application, the second command being configured to cause the client application to display an interface comprising a selectable option for transferring the second resource collection using the second resource distribution channel.

8. The non-transitory computer-readable storage medium of claim 7, wherein:
   the non-transitory computer-readable storage medium has computer-executable instructions for:
     identifying third resource transfer information related to a third resource transfer of the user, wherein the user receives a third resource collection as a result of the third resource transfer;
     analyzing the third resource transfer information and user information using the model to (i) predict a third future resource distribution of the third resource collection and (ii) determine a confidence level of the third future resource distribution;
     based on the confidence level of the third future resource distribution, transmitting the third resource transfer information to the quantum optimizer;
     receiving, from the quantum optimizer, one or more attributes of a third future resource distribution;
     comparing the one or more attributes of the third future resource distribution to the attributes of the plurality of resource distribution channels;
     based on comparing the one or more attributes of the third future resource distribution to the attributes of the plurality of resource distribution channels, identifying a third resource distribution channel having attributes corresponding to the one or more attributes of the third future resource distribution; and
     in response to identifying the third resource distribution channel, transmitting a third command to the client application, the third command being configured to cause the client application to display an interface comprising a selectable option for transferring the third resource collection using the third resource distribution channel;
   the quantum optimizer is configured for:
     receiving the third resource transfer information from the classical computer apparatus;
     analyzing the third resource transfer information and user information to predict the third future resource distribution of the third resource collection; and
     transmitting, to the classical computer apparatus, the one or more attributes of the third future resource distribution.

9. The non-transitory computer-readable storage medium of claim 6, wherein the user information related to the user comprises information regarding previous resource transfers performed by the user.

10. The non-transitory computer-readable storage medium of claim 6, wherein the user information related to the user comprises information regarding an accuracy of previous resource distribution predictions made by the quantum optimizer.

11. A method of providing resource distribution channels based on predicting future resource distributions, comprising:
monitoring, via a classical computer apparatus, in real-time, resource transfers of a user;
identifying, via a classical computer apparatus, based on said monitoring, resource transfer information related to a resource transfer of the user, wherein the user receives a resource collection as a result of the resource transfer;
identifying, via the classical computer apparatus, user information related to the user;
transmitting, via the classical computer apparatus, the resource transfer information and user information to a quantum optimizer;
receiving, via the quantum optimizer, the resource transfer information and user information from the classical computer apparatus;
analyzing, via the quantum optimizer, the resource transfer information and user information to predict a future resource distribution of the resource collection;
transmitting, via the quantum optimizer, to the classical computer apparatus, one or more attributes of the future resource distribution;
receiving, via the classical computer apparatus, from the quantum optimizer, the one or more attributes of the future resource distribution;
retrieving, via the classical computer apparatus, attributes of a plurality of resource distribution channels from a resource distribution channel library;
comparing, via the classical computer apparatus, the one or more attributes of the future resource distribution to the attributes of a plurality of resource distribution channels;
based on comparing the one or more attributes of the future resource distribution to the attributes of the plurality of resource distribution channels, identifying, via the classical computer apparatus, a first resource distribution channel having attributes corresponding to the one or more attributes of the future resource distribution; and
in response to identifying the first resource distribution channel, transmitting, via the classical computer apparatus, a command to a client application stored on a device of the user, the command being configured to cause the client application to display an interface comprising a selectable option for transferring the resource collection using the first resource distribution channel.

12. The method of claim 11, comprising:
analyzing, via the quantum optimizer, the user information to generate a model for predicting future resource distributions, wherein the model is configured for real-time processing by the classical computer apparatus;
identifying, via the classical computer apparatus, second resource transfer information related to a second resource transfer of the user, wherein the user receives a second resource collection as a result of the second resource transfer;
analyzing, via the classical computer apparatus, the second resource transfer information and user information using the model to (i) predict a second future resource distribution of the second resource collection and (ii) determine a confidence level of the second future resource distribution;
based on the confidence level of the second future resource distribution, comparing, via the classical computer apparatus, one or more attributes of the second future resource distribution to the attributes of the plurality of resource distribution channels;
based on comparing the one or more attributes of the second future resource distribution to the attributes of the plurality of resource distribution channels, identifying, via the classical computer apparatus, a second resource distribution channel having attributes corresponding to the one or more attributes of the second future resource distribution; and
in response to identifying the second resource distribution channel, transmitting, via the classical computer apparatus, a second command to the client application, the second command being configured to cause the client application to display an interface comprising a selectable option for transferring the second resource collection using the second resource distribution channel.

13. The method of claim 12, comprising:
identifying, via the classical computer apparatus, third resource transfer information related to a third resource transfer of the user, wherein the user receives a third resource collection as a result of the third resource transfer;
analyzing, via the classical computer apparatus, the third resource transfer information and user information using the model to (i) predict a third future resource distribution of the third resource collection and (ii) determine a confidence level of the third future resource distribution;
based on the confidence level of the third future resource distribution, transmitting, via the classical computer apparatus, the third resource transfer information to the quantum optimizer;
receiving, via the quantum optimizer, the third resource transfer information from the classical computer apparatus;
analyzing, via the quantum optimizer, the third resource transfer information and user information to predict the third future resource distribution of the third resource collection; and
transmitting, via the quantum optimizer, to the classical computer apparatus, the one or more attributes of the third future resource distribution;
receiving, via the classical computer apparatus, from the quantum optimizer, one or more attributes of a third future resource distribution;
comparing, via the classical computer apparatus, the one or more attributes of the third future resource distribution to the attributes of the plurality of resource distribution channels;
based on comparing the one or more attributes of the third future resource distribution to the attributes of the plurality of resource distribution channels, identifying, via the classical computer apparatus, a third resource distribution channel having attributes corresponding to the one or more attributes of the third future resource distribution; and
in response to identifying the third resource distribution channel, transmitting, via the classical computer apparatus, a third command to the client application, the third command being configured to cause the client application to display an interface comprising a selectable option for transferring the third resource collection using the third resource distribution channel.

14. The method of claim 11, wherein the user information related to the user comprises information regarding previous resource transfers performed by the user.

15. The method of claim 11, wherein the user information related to the user comprises information regarding an accuracy of previous resource distribution predictions made by the quantum optimizer.

* * * * *